(12) United States Patent
Lee et al.

(10) Patent No.: US 6,570,144 B1
(45) Date of Patent: May 27, 2003

(54) ACTIVE PIXEL CIRCUIT IN CMOS IMAGE SENSOR

(75) Inventors: Seo Kyu Lee, Chungcheongbuk-do (KR); Hang Kyoo Kim, Taeku-si (KR); Jung Soon Shin, Kyonggi-do (KR)

(73) Assignee: Hynix Semiconductor, Inc., Kyoungki-Do (KR)

( * ) Notice: Subject to any disclaimer, the term of this patent is extended or adjusted under 35 U.S.C. 154(b) by 307 days.

(21) Appl. No.: 09/722,727

(22) Filed: Nov. 28, 2000

(30) Foreign Application Priority Data

Mar. 2, 2000 (KR) ........................................ 2000-10435

(51) Int. Cl.[7] .............................................. H01L 27/00
(52) U.S. Cl. ..................................... 250/208.1; 348/308
(58) Field of Search ................................. 348/296, 302, 348/308, 311, 312; 250/208.1

(56) References Cited

U.S. PATENT DOCUMENTS 5,471,515 A  11/1995 Fossum et al.
6,476,372 B2 * 11/2002 Merrill et al. .......... 250/208.1

OTHER PUBLICATIONS

Eric R. Fossum, "CMOS Image Sensors: Electronic Camera on A Clip", IEEE Int'l Electron Devices Meeting Technical Digest, Dec. 10–13, 1995, Washington, D.C.

* cited by examiner

Primary Examiner—Hung Xuan Dang
(74) Attorney, Agent, or Firm—Birch, Stewart Kolasch & Birch, LLP

(57) ABSTRACT

An active pixel circuit in a CMOS image sensor includes a photodiode to accumulate charge due to incident light. A first transfer transistor is arranged to pass a transfer signal when turned on by a column selection signal. A second transfer transistor transfers the accumulated charge from the photodiode to a first floating node when turned on by the transfer signal from the first transfer transistor. A source follow driver transistor changes the potential of a second floating node according to the charge transferred to the first floating node. A line selecting transistor reads out the potential of the second floating node when turned on by a line selection signal, and a reset transistor resets the charges accumulated in the first floating node when the reading out operation is finished.

23 Claims, 4 Drawing Sheets

A CTIVE PIXEL CIRCUIT IN CMOS IMAGE
SENSOR

BACKGROUND OF THE INVENTION

1. Field of the Invention

The present invention relates to a complementary metal oxide semiconductor (CMOS) image sensor, and more particularly to an active pixel circuit in a CMOS image sensor.

2. Background of the Related Art

Electronic products recently put on the market perform multiple functions. For example, a personal computer may include a compact disk-read only memory (CD-ROM) driver and a digital versatile disk (DVD) player, or a camera for video conferences. A digital camera may also be included in such a device to enable editing of a picture via computer. Such a small camera mounted on a notebook computer and a cellular phone will also create new markets and opportunities.

In the case of large-sized products such as a personal computer, a camera may easily be mounted thereon. However, when the camera is mounted on a portable product such as a notebook computer or a cellular phone, serious problems are caused in view of the camera's size and power consumption. Particularly, such problems occur in a video camera using an image pick-up device or sensing element which provides an image by light incident thereon.

Most video cameras need a large power source in addition to a main body containing the sensing element. The reason for this need is that a charge-coupled device (CCD) used as the image pick-up device increases power consumption.

Most conventional CCDs are driven by higher voltages (e.g., +15V, −9V) than the voltage required by CMOS circuits. Since a process for fabricating CCDs is basically similar to a process for forming a bipolar transistor, there is a problem that the cost of the process is higher than the cost of the process for fabricating CMOS circuits.

To solve these problems, a conventional CMOS image sensor has been developed to realize an image pick-up device in a CMOS process which operates at low voltages, reduces power consumption, and reduces costs.

FIG. 1 is a circuit diagram of a 3 transistor pixel design in a related art CMOS image sensor. As shown in FIG. 1, the 3 transistor pixel includes a reset transistor 1 for receiving a reset signal at its gate through a reset signal input terminal 2. One of the electrodes of the reset transistor 1 is connected to a floating node 5 and the other of its electrodes is connected to a VDD terminal 3. The pixel also includes a selecting transistor 4 having a gate connected to the floating node 5 and one of its electrodes connected to the VDD terminal 3. An access transistor 7 receives at its gate a row selection signal through a row selection signal input terminal, and one of its electrodes is connected to the selecting transistor 4 in series. The other terminal of the access transistor 7 is connected with a column selection line 9. The pixel also includes a photodiode 6 between the floating node 5 and a ground terminal 10.

The sensing operation of the above CMOS image sensor of the 3 transistor pixel will be explained. Charges are accumulated in the photodiode 6 due to externally incident light. The accumulated signal charges change electric potential of the floating node 5, which is a source terminal of the reset transistor 1 and the gate of the selecting transistor 4. The selecting transistor 4 is a pixel level source follower. The potential change of the gate of the selecting transistor 4 changes a bias of the drain node of the access transistor 7 and the source terminal of the selecting transistor 4.

While the signal charges are accumulated in the photodiode 6, the potential of the source terminals of the reset transistor 1 and the selecting transistor 4 changes. If a row selection signal is applied to the gate of the access transistor 7 through the row selection signal input terminal 8, the potential difference produced from the photodiode 6 is outputted to the column selection line 9. After the signal level of the photodiode 6 is detected, the reset transistor 1 is turned on by the reset signal through the reset signal input terminal 2 to reset all the signal charges accumulated in the photodiode 6.

The CMOS image sensor of the 3 transistor pixel described above generates noise. In an attempt to solve this noise problem, a CMOS image sensor having a 4 transistor pixel design, as shown in FIG. 2, has been suggested. The 4 transistor pixel in FIG. 2 includes a reset transistor 21 for receiving a reset signal at its gate through a reset signal input terminal 22. One electrode of the reset transistor 21 is connected to a floating node 25 and the other electrode is connected to a VDD terminal 23. A selecting transistor 24 has its gate connected to the floating node 25 and one electrode connected to the VDD terminal 23. An access transistor 30 receives a row selection signal at its gate through a row selection signal input terminal 31, and two electrodes of the access transistor 30 are connected in series between the selecting transistor 24 and a column selection line 32. A transfer transistor 29 has one electrode connected to the floating node 25, and its gate is connected to a transfer signal input terminal 28. The 4 transistor pixel also includes a photodiode 27 for concentrating the accumulated charges its surface and including a photogate 26 for transferring charge between the transfer transistor 29 and a ground terminal 33.

The sensing operation of the CMOS image sensor of the conventional 4 transistor pixel in FIG. 2 will be described. First, charges are accumulated in the photodiode 27 due to externally incident light. While the bias of the photogate 26 maintains a high level, the accumulated signal charges concentrate around the surface of the photodiode 27. When a transfer signal is applied to the gate of the transfer transistor 29 to turn on the transfer transistor 29, the signal level of the photodiode 27 is transferred to the floating node 25.

If the reset transistor 21 remains turned off, the signal charges accumulated in the floating node 25 change the potential of the floating node 25 which is also the source terminal of the reset transistor 21 and the gate of the selecting transistor 24.

The potential change of the gate of the selecting transistor 24 changes the bias of the drain node of the access transistor 30 and the source terminal of the selecting transistor 24. When the row selection signal is applied to the gate of the access transistor 30 through the row selection signal input terminal 31, the potential difference by the signal charges produced from the photodiode 27 is outputted to the column selection line 32. After detecting the signal level by producing the charges of the photodiode 27, the reset transistor 21 is turned on by the reset signal through the reset signal input terminal 22 to reset all the signal charges on the photodiode 27.

This process is repeated to read and reset the respective signal level, thereby reading the reference potential. However, the aforementioned related art CMOS image sensors in FIGS. 1 and 2 have the following problems.

The CMOS image sensor of the 3 transistor design can have an enlarged photodiode (i.e., light-receiving region) to increase its fill factor, but the additional circuitry is required to eliminate noise generated in the signal level. Thus, the size of the pixel becomes increased. Also, because the capacitance of the photodiode in such a design functions as a direct input capacitance, there is a problem that the sensitivity is decreased.

The CMOS image sensor of the 4 transistor design to solve these problems improves an image quality by increasing charge transfer efficiency using CCD technique to control noise and increases the sensitivity by using a floating diffusion node of which input capacitance is small. However, the CMOS image sensor of the 4 transistor design has a problem that its blue response characteristic is poor due to the use of the photogate and the fill factor is also poor. Image lagging may also occur due to the floating node. Furthermore, the use of the photogate complicates the fabrication process.

SUMMARY OF THE INVENTION

Accordingly, the present invention is directed to an active pixel circuit in a CMOS image sensor that substantially obviates one or more of the problems due to limitations and disadvantages of the related art.

An advantage of the present invention is the provision of an active pixel circuit in a CMOS image sensor which improves a pixel structure to obtain an output equal to that of a CCD.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the active pixel circuit in a CMOS image sensor according to an aspect of the present invention includes a photodiode to produce charge due to incident light; a first transfer transistor to pass a transfer signal when turned on by a column selection signal; a second transfer transistor to transfer the charge from the photodiode to a first floating node when turned on by the transfer signal from the first transfer transistor; a source follower driver transistor to change a potential of a second floating node according to the charge at the first floating node; a line selecting transistor to read out the potential of the second floating node when turned on by a line selection signal; and a reset transistor for resetting the charges accumulated in the first floating node when the reading out operation is finished.

In another aspect, the invention includes a unit pixel circuit in a CMOS image sensor, including a photodiode to produce charge due to incident light; a first transfer transistor having a gate connected to a column selection line and a terminal connected to a transfer signal line; a second transfer transistor connected between the photodiode and a first floating node, and having a gate connected to another terminal of the first transfer transistor; a source follower driver transistor connected between a power supply line and a second floating node, and having a gate connected to the first floating node; a line selecting transistor connected between an output node and the second floating node, and having a gate connected to a line selection line; and a reset transistor connected between the power supply line and the first floating node, and having a gate connected to a reset line.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
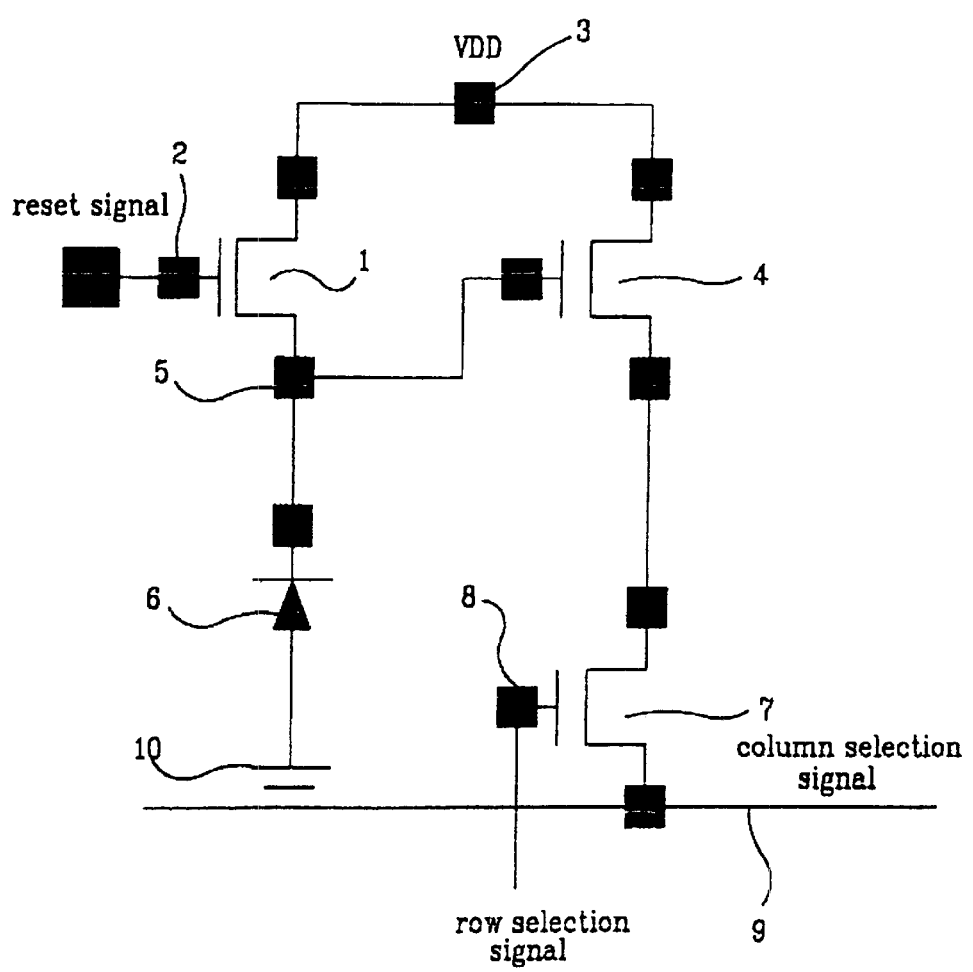
FIG. 1 is a circuit diagram of a 3 transistor pixel design in a related art CMOS image sensor.
Figure 2:
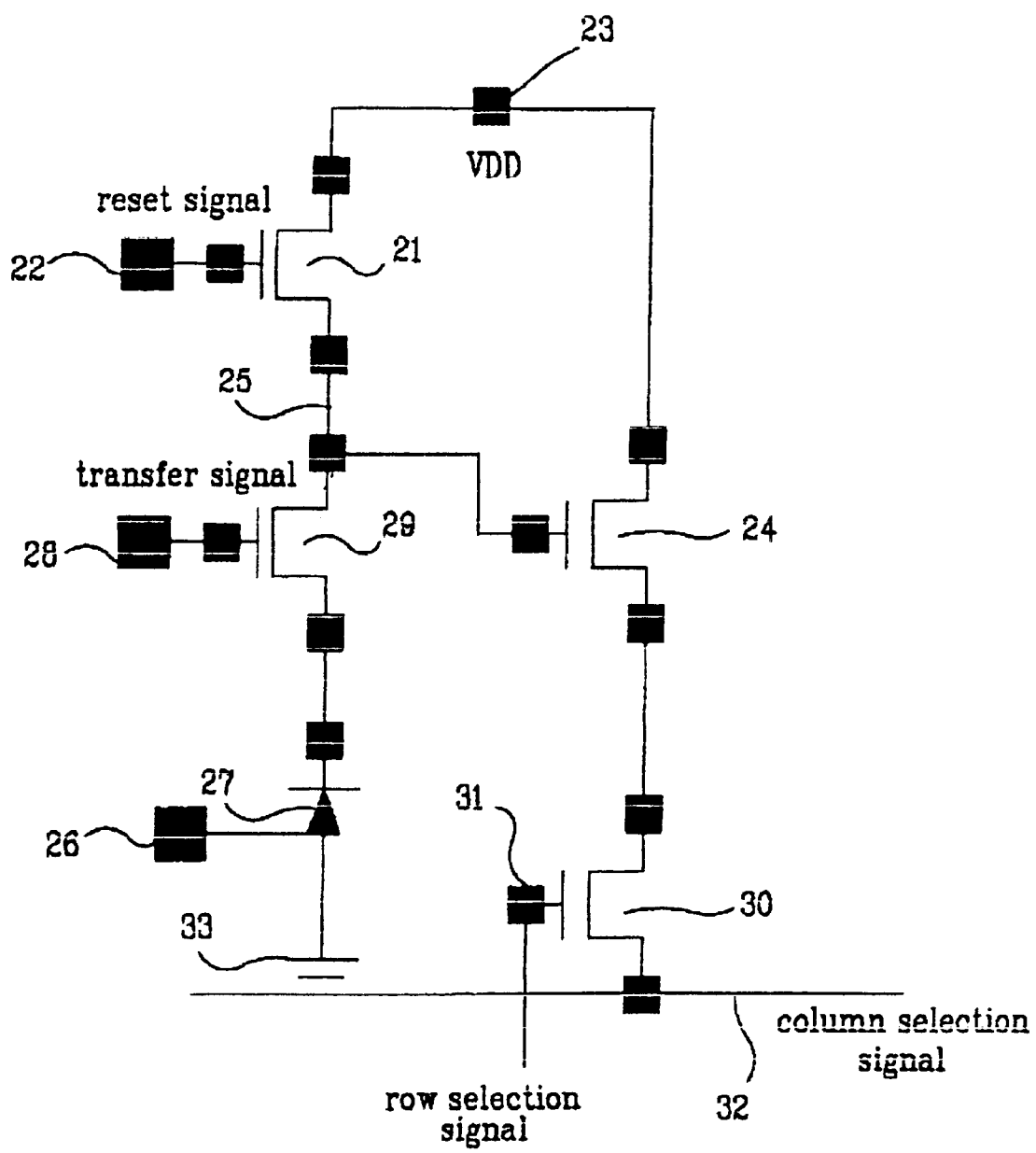
FIG. 2 is a circuit diagram of a 4 transistor pixel design in the related art CMOS image sensor.
Figure 3:
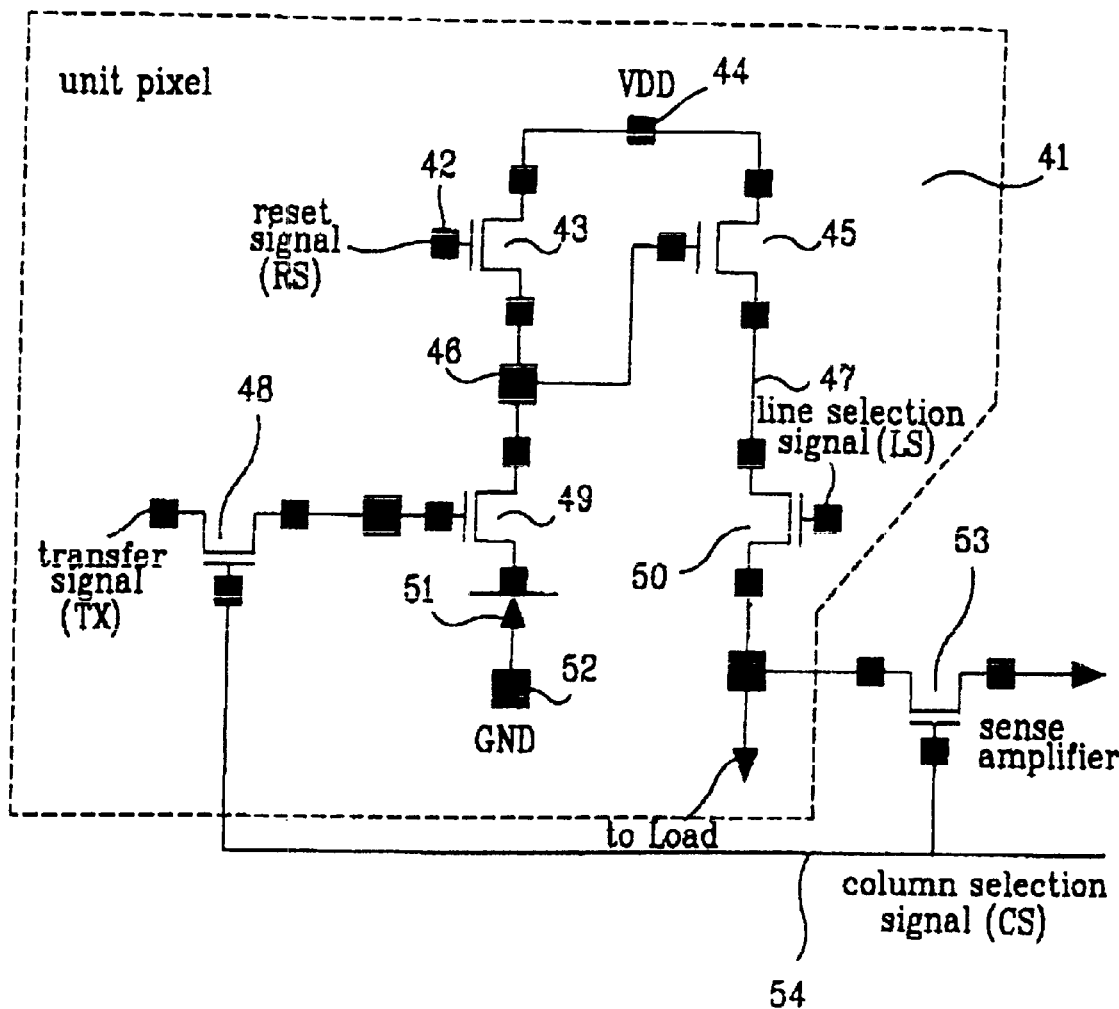
FIG. 3 is a circuit diagram of a pixel in the CMOS image sensor according to the present invention; and, FIG. 4 is a timing chart showing a pixel driving operation in the CMOS image sensor according to the present invention.

An active pixel circuit in a CMOS image sensor according to the present invention will be described with reference to FIGS. 3 and 4. FIG. 3 shows a construction of an unit pixel of the CMOS image sensor of the present invention, in which an output of the CMOS image sensor is identical to that of a CCD, so that an existing chip set of the CCD may be used.

First, a unit pixel 41 of the CMOS image sensor includes a reset transistor 43 receiving a reset signal at its gate through a reset signal input terminal 42, and having one electrode connected to a first floating node 46 and another electrode connected to a VDD terminal 44. A source follower driver transistor 45 has its gate connected to the first floating node 46, and another of its electrodes is connected to the second floating node 47. A first transfer transistor 48 is arranged to have its gate connected to a column selection signal supplying line 54 which provides a column selection signal to switch a transfer signal. A second transfer transistor 49 is arranged to have its gate connected to one electrode of the first transfer transistor 48 to transfer charges from a photodiode 51 at an appropriate time. The photodiode 51 is formed between the second transfer transistor 49 and a ground terminal 52, and accumulates signal charges due to incident light. A line selecting transistor 50 has one of its electrodes connected to the second floating node 47, and receives a line selection signal at its gate to select a line. The CMOS image sensor includes a column selecting transistor 53 receiving a column selection signal at its gate, and one of its electrodes is connected to an electrode of the line selecting transistor 50 and a source follower node. Another electrode of the column selecting transistor 53 is connected to a sense amplifier (not shown). The column selecting transistor 43 is formed to correspond to all unit pixels 41 formed on one column of the CMOS sensor array.

The image sensing and signal output operation of the aforementioned CMOS image sensor will now be described. Charges are accumulated in the photodiode 51 due to incident light from the outside. When the first transfer transistor 48 is turned on by the column selection signal CS, the transfer signal is applied to the gate of the second transistor 49, so that the signal level of the photodiode 51 is transmitted to the first floating node 46 by the second transistor 49.

In this state, if the reset transistor 43 remains turned off, the potential of the first floating node 46 and of the source terminal of the reset transistor 43 is changed by the signal charges accumulated at the photodiode 51, thereby changing the potential of the gate of the source follower driver transistor 45. This potential change of the gate of the source follower driver transistor 45 changes the bias of the drain node of the line selecting transistor 50 and the source terminal of the source follower driver transistor 45. When the line selection signal is applied to the gate of the access transistor 50, the potential difference produced from the photodiode 51 is outputted to one electrode of the column selecting transistor 53, which is connected to a load. When the column selection signal is applied to the gate of the column selecting transistor 53, the signal at this potential difference is outputted to the sensing amplifier.

After detecting the signal level produced by the charge on the photodiode 51, the reset transistor 43 is turned on by the reset signal through the reset signal input terminal 42 to reset all the signal charges accumulated in the photodiode 51.

The image sensing and signal output operation according to the present invention will be described referring to FIG. 4. Each pixel of every column selecting section performs the outputting operation of the signal charges by combining the reset signal (RS) with the transfer signal (TX) for transferring the signal charges.

Figure 4:
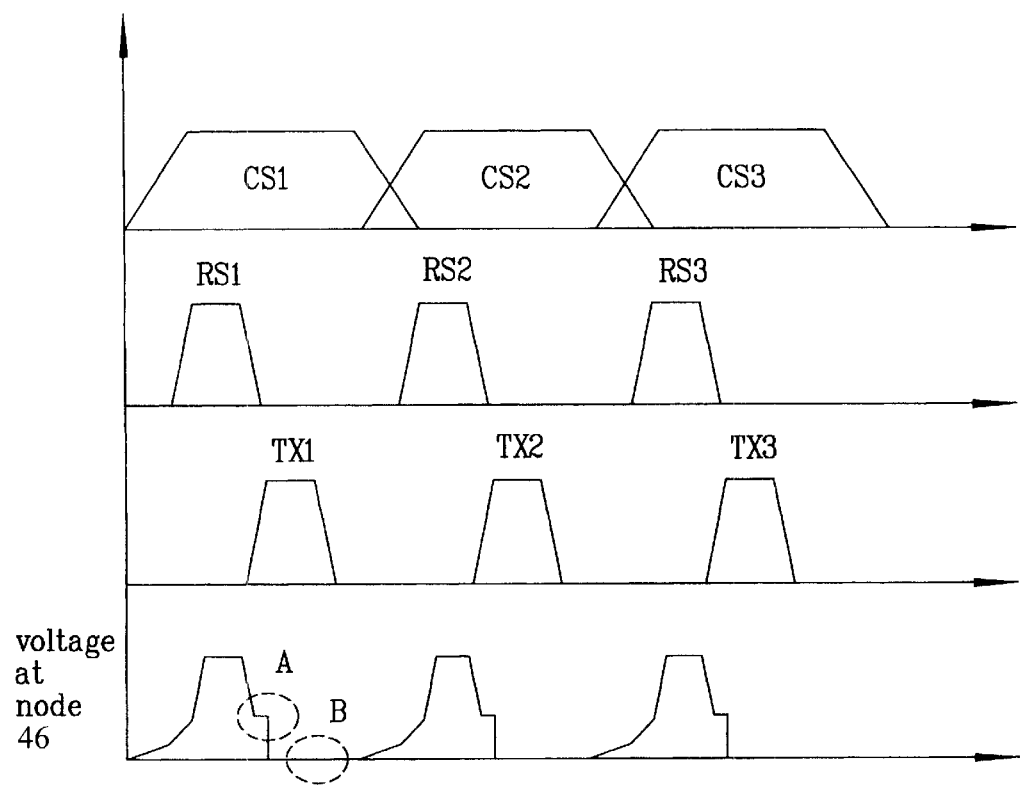

When the pixel array of an unit pixel is n×m as in FIG. 4, the period of one line selection (LS) signal becomes m*CS, where CS is a column selection signal. This period is for the case of reading out data line by line. The column selection signal is simultaneously applied to the gate of the first transfer transistor 48 and the gate of the column selecting transistor 53. Therefore, the transfer time of the signal charges are identical to the column selection time.

In the aforementioned CMOS image sensor according to the present invention, the reset operation and the transfer operation of the signal charges are sequentially performed in the CS period for the unit of pixel. The reset signal RS and the transfer signal TX should be maintained at high level in each column selection section to achieve the same output with that of the CCD. When the reset signal RS is high, the signal charges accumulated in the first floating node 46 are reset. When the transfer signal TX is high, the signal charges accumulated in the photodiode are transferred to the first floating node 46. Accordingly, the signal is detected during the time from when the transfer signal TX is high to the time when the next reset signal RS is high. This time corresponds to a portion B of FIG. 4.

The potential of the floating node 46, during the time from when the reset signal RS is transited from high level to low level to just before the time when the transfer signal TX is high, becomes a reference signal. This corresponds to a portion A of FIG. 4.

Correlated double sampling (CDS) which eliminates pixel level noise is realized by the potential difference between the portion A and the portion B.

The CMOS image sensor according to the present invention permits charge transfer from the photodiode 51 to the first floating node 46 for the unit of pixel by using the first and second transfer transistors 48, 49.

As aforementioned, the active pixel circuit of the CMOS image sensor has the following advantages. The active pixel circuit of the CMOS image sensor has the same output characteristic as that of a CCD, so that image quality is improved compared with a CMOS image sensor of 3TR or 4TR. Because the existing related art CCD chip set may be used as it is, system applicability and interoperability is increased. Also, the CMOS operative at low voltage is used, image quality of the CMOS image sensor may be obtained to be equivalent to that of the CCD. Therefore, high quality and miniaturization of the device can be obtained. Power consumption is also reduced.

It will be apparent to those skilled in the art that various modifications and variations can be made in the active pixel circuit in the CMOS image sensor according to the present invention without departing from the spirit or scope of the invention. Thus, it is intended that the present invention covers the modifications and variations of the invention provided they come within the scope of the appended claims and their equivalents.

What is claimed is:

1. An active pixel circuit in a CMOS image sensor, comprising:

a photodiode to produce charge due to incident light;

a first transfer transistor to pass a transfer signal when turned on by a column selection signal;

a second transfer transistor to transfer the charge from the photodiode to a first floating node when turned on by the transfer signal from the first transfer transistor;

a source follower driver transistor to change a potential of a second floating node according to the charge at the first floating node;

a line selecting transistor to read out the potential of the second floating node when turned on by a line selection signal; and a reset transistor for resetting the charges accumulated in the first floating node when the reading out operation is finished.

2. The active pixel circuit in a CMOS image sensor as claimed in claim 1, further comprising a column selecting transistor for outputting the potential read out by the line selecting transistor to a sensing amplifier when turned on by a column selection signal applied to its gate.

3. The active pixel circuit in a CMOS image sensor as claimed in claim 2, wherein the column selecting transistor is formed corresponding to a plurality of pixels formed in one column of the image sensor.

4. The active pixel circuit in a CMOS image sensor as claimed in claim 2, wherein the column selection signal is simultaneously applied to a gate of the first transfer transistor and the gate of the column selecting transistor, so that a transfer time of the charge is identical to a column selection time.

5. The active pixel circuit in a CMOS image sensor as claimed in claim 4, wherein a reset signal applied to a gate of the reset transistor and the transfer signal are sequentially maintained at high level in each column selection time.

6. The active pixel circuit in a CMOS image sensor as claimed in claim 5, wherein when the reset signal is high, the signal charges accumulated in the first floating node are reset and when the transfer signal is high, the signal charges accumulated in the photodiode are transferred to the first floating node.

7. The active pixel circuit in a CMOS image sensor as claimed in claim 5, wherein the output potential is detected at during the time from when the transfer signal becomes high to the time when a following reset signal becomes high.

8. The active pixel circuit in a CMOS image sensor as claimed in claim 5, wherein the potential of the second floating node is used as a reference signal during the time after the reset signal is transited from high level to low level and before the time when the transfer signal is high, becomes.

9. The active pixel circuit in a CMOS image sensor as claimed in claim 2, wherein a gate of the column selecting transistor receives the column selection signal, and one electrode of the column selecting transistor is connected to an electrode of the line selecting transistor, and another electrode thereof of the column selecting transistor is connected to the sensing amplifier.

10. The active pixel circuit in a CMOS image sensor as claimed in claim 1, wherein the pixel is selected by selectively switching the transfer signal (Tx) by the column selection signal (CS) applied to the first transfer transistor, to transfer the charges from the photodiode to the first floating node for each pixel unit.

11. The active pixel circuit in a CMOS image sensor as claimed in claim 1, wherein a gate of the reset transistor is connected to a reset terminal, one electrode of the reset transistor is connected to a first floating node, and another electrode of the reset transistor is connected to a power supply terminal.

12. The active pixel circuit in a CMOS image sensor as claimed in claim 1, wherein a gate of the source follower driver transistor is connected to the first floating node, one electrode of the source follower driver transistor is connected to a power supply terminal, and another electrode of the source follower drive transistor is connected to the second floating node.

13. The active pixel circuit in a CMOS image sensor as claimed in claim 1, wherein the first transfer transistor connects the gate thereof to a column selection signal supplying line providing a column selection signal, one electrode thereof to a transfer signal input terminal, and another electrode thereof to a gate of the second transfer transistor.

14. The active pixel circuit in a CMOS image sensor as claimed in claim 1, wherein the second transfer transistor has one electrode connected to the photodiode and another electrode connected to the first floating node, to be turned on by the transfer signal which is applied to a gate of the second transfer transistor by the first transfer transistor.

15. The active pixel circuit in a CMOS image sensor as claimed in claim 1, wherein the photodiode is disposed between the second transfer transistor and a ground terminal.

16. A unit pixel circuit in a CMOS image sensor, comprising:

a photodiode to produce charge due to incident light;

a first transfer transistor having a gate connected to a column selection line and a terminal connected to a transfer signal line;

a second transfer transistor connected between the photodiode and a first floating node, and having a gate connected to another terminal of the first transfer transistor;

a source follower driver transistor connected between a power supply line and a second floating node, and having a gate connected to the first floating node;

a line selecting transistor connected between an output node and the second floating node, and having a gate connected to a line selection line; and a reset transistor connected between the power supply line and the first floating node, and having a gate connected to a reset line.

17. The unit pixel circuit in a CMOS image sensor as claimed in claim 16, wherein the output node is connected to a sense amplifier external to the unit pixel circuit.

18. The unit pixel circuit in a CMOS image sensor as claimed in claim 16, wherein the first transfer transistor transfers a transfer signal from the transfer signal line to the gate of the second transfer transistor when enabled by a column selection signal from the column selection line.

19. The unit pixel circuit in a CMOS image sensor as claimed in claim 18, wherein the second transfer transistor transfers charge from the photodiode to the first floating node when enabled by the transfer signal from the first transfer transistor.

20. The unit pixel circuit in a CMOS image sensor as claimed in claim 19, wherein the source follower driver transistor operates to transfer charge the first floating node to the second floating node.

21. The unit pixel circuit in a CMOS image sensor as claimed in claim 20, wherein the line selecting transistor operates to transfer charge the second floating node to the output node when enabled by a line selection signal from the line selection line.

22. The unit pixel circuit in a CMOS image sensor as claimed in claim 16, wherein the reset transistor operates to reset a voltage of the first floating node when enabled by a reset signal from the reset line.

23. The unit pixel circuit in a CMOS image sensor as claimed in claim 16, wherein the photodiode is a two-terminal device and is connected between the second transfer transistor and ground.

* * * * *